United States Patent

Jager

[19]

[11] Patent Number: 6,067,449
[45] Date of Patent: *May 23, 2000

[54] ANTENNA SELECTION CONTROL CIRCUITRY

[75] Inventor: Michael David Jager, Surrey, United Kingdom

[73] Assignee: Nokia Mobile Phones Limited, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/763,034

[22] Filed: Dec. 10, 1996

[30] Foreign Application Priority Data

Dec. 21, 1995 [GB] United Kingdom .................... 9526139

[51] Int. Cl.⁷ .................................................. H04B 7/08

[52] U.S. Cl. ...................... 455/277.2; 455/134; 455/135; 455/136; 455/63

[58] Field of Search ............................. 455/277.1, 277.2, 455/276.1, 278.1, 272, 275, 133, 134, 135, 136, 140, 226.2, 226.3, 63; 375/347

[56] References Cited

U.S. PATENT DOCUMENTS

| | | | |
|---|---|---|---|
| 4,214,213 | 7/1980 | Ferrie | 328/117 |
| 4,255,816 | 3/1981 | Grunza et al. | 455/277 |
| 4,495,653 | 1/1985 | Hamada | 455/277 |
| 4,876,743 | 10/1989 | Lindenmeier et al. | 455/133 |
| 5,339,452 | 8/1994 | Sugawara | 455/277.2 |
| 5,351,274 | 9/1994 | Chennakeshu et al. | 375/100 |
| 5,402,451 | 3/1995 | Kaewell, Jr. et al. | 455/134 |
| 5,548,836 | 8/1996 | Taromaru | 455/277.1 |
| 5,634,204 | 5/1997 | Takahashi et al. | 455/134 |

FOREIGN PATENT DOCUMENTS

| | | |
|---|---|---|
| 0 318 665 | 6/1989 | European Pat. Off. . |
| 0 419 674 A1 | 4/1991 | European Pat. Off. . |
| 0 454 585 B1 | 10/1991 | European Pat. Off. . |
| 0 457 460 A2 | 11/1991 | European Pat. Off. . |
| 0 500 326 A2 | 8/1992 | European Pat. Off. . |
| 0 620 657 A1 | 10/1994 | European Pat. Off. . |
| 0 676 870 A1 | 10/1995 | European Pat. Off. . |
| 59-17741 | 1/1984 | Japan ................................ 455/277.2 |
| 2 044 569 | 10/1980 | United Kingdom . |
| 2 144 947 | 3/1985 | United Kingdom . |
| WO 94/10764 | 5/1994 | WIPO . |
| WO 94/13068 | 6/1994 | WIPO . |
| WO 95/13670 | 5/1995 | WIPO . |

OTHER PUBLICATIONS

JP 62–0047222 A & Patent Abstracts of Japan E–257 vol. 11 No. 231 pp. 91 (NEC Corp).

Patent Abstracts Of Japan, vol. 11, No. 145 (E–505), May 12, 1987 and JP 61 283234 A (NEC Corp.), Dec. 13, 1986, abstract.

Patent Abstracts Of Japan, vol. 11, No. 231 (E–527), Jul. 28, 1987 and JP 62 047222 A (NEC Corp.), Feb. 28, 1987, abstract.

Patent Abstracts Of Japan, vol. 13, No. 126 (E–734), Mar. 28, 1989 and JP 63 294128 A (Fujitsu Ltd.), Nov. 30, 1988, abstract.

*Primary Examiner*—Reinhard J. Eisenzopf
*Assistant Examiner*—Lester G. Kincaid
*Attorney, Agent, or Firm*—Perman & Green, LLP

[57] ABSTRACT

Antenna selection control apparatus for a diversity antenna system including at least two antennas. The received power strength is measured from a selected antenna and compared with a reference power level. The reference power level is adjusted depending upon the signal to noise ratio of received signals, and if the selected antenna falls below the adjusted threshold another antenna is selected.

8 Claims, 5 Drawing Sheets

log amp equation $V_o = -\eta V_T \left( \ln \dfrac{V_{in}}{R_L} - \ln I_o \right)$ where $I_f = I_o \left( \varepsilon^{(V_f/\eta V_T)} - 1 \right) \approx I_o$ adder equation $V_o = -(V_1 + V_2 + V_3)$

ANTENNA SELECTION CONTROL CIRCUITRY

FIELD OF INVENTION

The present invention relates to apparatus and a method for controlling the selection of an antenna for a receiver having at least two antennas. In particular, but not exclusively, the present invention relates to antenna selection control circuitry in a communication system such as a radio telephone network.

BACKGROUND TO INVENTION

Existing communication systems suffer from a number of effects which act to degrade the quality of communication between a transmitting unit and a receiving unit within the communication system. In particular, in a radio telephone network for example, which comprises a plurality of mobile stations or radio telephones communicating with a base station connected to other base stations in the radio telephone network, both the radio telephone and the base station are relatively close to ground level. Since the base station and radio telephone are close to ground level obstacles such as buildings, walls, cars and people inhibit direct line of sight communication between them, especially in urban areas. Thus, they typically communicate between each other by reflected or diffracted radio wave signals. Due to the multiple reflections and diffractions the r.f. power received by a radio telephone or a base station is at a much lower level than would be expected from the inverse square law if direct line of sight communication was possible. Typically, the power loss is of the form $d^{-a}$ where d is the distance between the transmitting and receiving stations and a lies between 3 and 4. This power loss is known as path loss.

The problem of path loss has been addressed in known radio telephone systems by the base stations monitoring the strength of signals received from various radio telephones communicating therewith (to form a received signal strength indicator RSSI signal), and from time to time issuing a request over the air for an individual radio telephone to increase or decrease its transmitting power. The radio telephone responds by adjusting the gain of its transmitting amplifier which is typically under microprocessor control. Generally, the amplifier is operable at one of a plurality of predetermined output power levels which are selected automatically in response to the request from the base station for a change in the level of the output power. Typically, the power levels are defined in the radio telephone system specification. For each power level a nominal value is specified together with a permitted tolerance range.

In addition to the normal fading there is another form of fading known as Rayleigh fading. This type of fading is a short term fading and is characterised by rapid variations in the r.f. power level of a signal received by a radio telephone or base station. It is caused by the multiple signal paths arising from the reflections and diffractions forming a quasi-stationary standing wave pattern with nulls at approximately half wavelength intervals of the signal frequency. As a user moves through their environment, they move through the nulls.

The effect of the periodic nulls in received signal power due to Rayleigh fading is that transmitted data may be lost thereby introducing errors into the transmission. In order to ensure that there is sufficient integrity in the radio telephone network redundant data has to be sent such as error-correcting codes. This results in a reduced information or data handling capacity for the network. Additionally, the multiple signal paths introduce time delays between signals incident at a particular radio telephone which causes inter-symbol interference. This is a particular problem in communication systems having relatively high data rates e.g. where $$\frac{1}{\text{symbol rate}} \leq 10 \text{ μs}$$

The problems of Rayleigh fading have been addressed by using a technique known as Slow Frequency Hopping (SFH) or Frequency Hopping. In this technique, the carrier frequency of a particular communication channel is discontinuously changed between discrete carrier frequencies of a set of defined carrier frequencies. Since the Rayleigh fading of signals at different frequencies is not the same, and becomes increasingly different as the difference between the frequencies increases, frequency hopping for a particular communication channel substantially reduces the effects of Rayleigh fading for that communication channel effectively transforming errors due to Rayleigh fading into widely spread random errors. Another advantage is that co-channel interference from other cells is reduced.

Such a technique is known from the GSM system for cellular radio telephony, where the sequence of data bursts making up a particular communication channel or Traffic Channel (TCH) are cyclically assigned to different frequencies by the base station handling that communication channel. Additionally, a technique known as interleaving is employed in the GSM system. This involves jumbling up data to be transmitted such that normally adjacent groups of data are transmitted at different times, and de-interleaving the transmitted signal at the receiver.

In a system having relatively low data rates, e.g. $\geq 25k$ symbol/s, the periodic variation in the signal strength is the main problem. Such a system is typically referred to as suffering from non-frequency selective or "flat" multipath Rayleigh fading. The Japanese PDC system is such a system. It is known to utilize two or more antennas in a mobile terminal to reduce the effects of flat Rayleigh fading. This is commonly referred to as antenna diversity. Respective antennas are selected for use based on a comparison of various criteria indicative of the quality of signals received by the antennas.

A number of methods for determining the criteria for selecting an antenna are known in the art. For example, European patent application number 0 318 665 describes the selection of antennas based on a received signal strength indication (RSSI) signal in the context of a time division multiplexed radio network. In such a system, the antenna receiving the signal of greatest strength is selected. If the signal from the selected antenna falls below a threshold then another antenna is selected. A further method of selecting antennas is disclosed in European patent application number 0 454 585, which describes a method of predicting which antenna will receive a signal having the greatest quality within a given time period.

However, the known approaches to the problem of flat Rayleigh fading have their own drawbacks. For a threshold fixed at a given RSSI there is a finite probability that the signal strength will dip below the RSSI threshold thereby causing selection of another antenna. Thus, irrespective of the quality of a signal there is a minimum achievable error rate for a system due to the selection of another antenna. This gives rise to a so called error floor. For high quality signals such as those having a large signal to noise ratio (SNR) where a large fade, i.e. one which drops below the fixed RSSI threshold, does not intolerably impair the signal quality, another antenna is selected needlessly which may operate at an error rate worse than the one previously selected. Additionally, needless selection of other antennas is undesirable since there is a phase difference between signals at different antennas which results in a phase mismatch of the signals giving rise to further errors.

SUMMARY OF THE INVENTION

In a first aspect of the invention there is provided antenna selection control apparatus for a receiver having at least two antennas, comprising means for monitoring a signal quality of a signal received from a selected one of at least two antennas, comparing means for comparing the signal quality of the received signal with a reference signal quality level, selection means for selecting another of the at least two antennas in accordance with the comparison, and means for monitoring a signal quality characteristic for received signals, wherein there is further provided reference signal quality level adjustment means for adjusting the reference signal quality level in accordance with said signal quality characteristic.

In a second aspect of the invention there is provided a method for selecting an antenna for a receiver having at least two antennas, comprising comparing a signal indicative of received signal quality from a selected one of the at least two antennas with a reference signal quality level, and selecting another of the at least two antennas in accordance with the comparison, characterised by adjusting the reference signal quality level in accordance with a further signal quality characteristic for received signals.

An advantage of the present invention is that needless or unnecessary switching between antennas is reduced. This reduces the level at which an error rate floor occurs, and thus lowers the minimum achievable error rate of the receiver system.

In a preferred embodiment of the invention, the reference signal quality level is adjusted in correspondence to a probability of error in the received signal from the selected one of the at least two antennas, which acts to optimize the signal quality reference level with respect to the signal quality characteristic substantially independent of fading effects.

Preferably, the further signal quality characteristic is signal to noise ratio or carrier to interference ratio. Such a signal quality characteristic is typically measured by a receiver system and thus is easily available for use in the present invention. Additionally, the signal to noise ratio or carrier to interference ration is a more accurate measure of signal quality since the RSSI measurement accuracy is limited due to the wide dynamic range of RSSI and the receiver amplifier accuracy.

Suitably, the signal quality comprises signal strength which is the signal quality most affected by fading effects, and is a good measure of such effects.

Furthermore, since the signal to noise ratio determines the switching threshold, but is not actually the threshold it can be updated slowly and thus less processing is required than if switching were based on an instantaneous measurement of a signal quality characteristic.

Typically, the signal quality reference level is decreased for an increase in further signal quality characteristic and the signal quality reference level is increased for a decrease in further signal quality characteristic.

When the further signal quality characteristic exceeds a predetermined threshold selection of another antenna is disabled.

Preferably the further signal quality characteristic is signal to noise ratio.

Embodiments of the invention will now be described, by way of example only, and with reference to the accompanying drawings.

DETAILED DESCRIPTION OF EMBODIMENTS OF THE INVENTION

Figure 1:
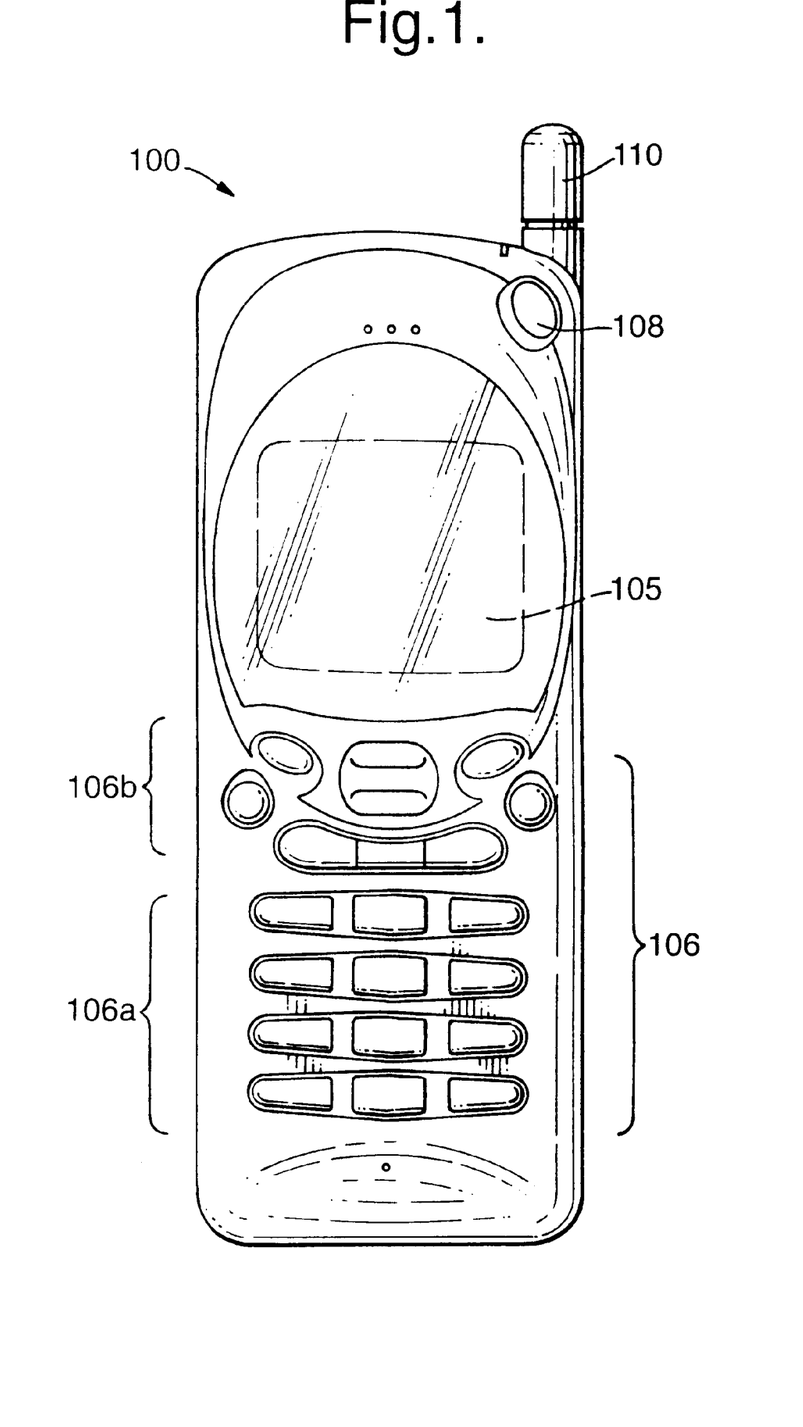
FIG. 1 shows a radio telephone suitable for use with the present invention.

The portable radio telephone shown in FIG. 1 is a cellular telephone 100 powered by a rechargeable battery pack. The telephone 100 includes a transceiver 102 and all the other features conventionally found in a cellular telephone, as shown schematically in FIG. 2. Also, since these aspects of the telephone are not directly relevant to the instant invention no further details will be given here, except to say that a single microprocessor 104 (see FIG. 2) is employed to control all the basic functions of the telephone 100 and to control the keypad and display functions. Alternatively, however, the telephone functions may be controlled by a master microcomputer, while the keypad and display functions are under the control of a separate slave microcomputer coupled to communicate with the master microcomputer.

Figure 2:
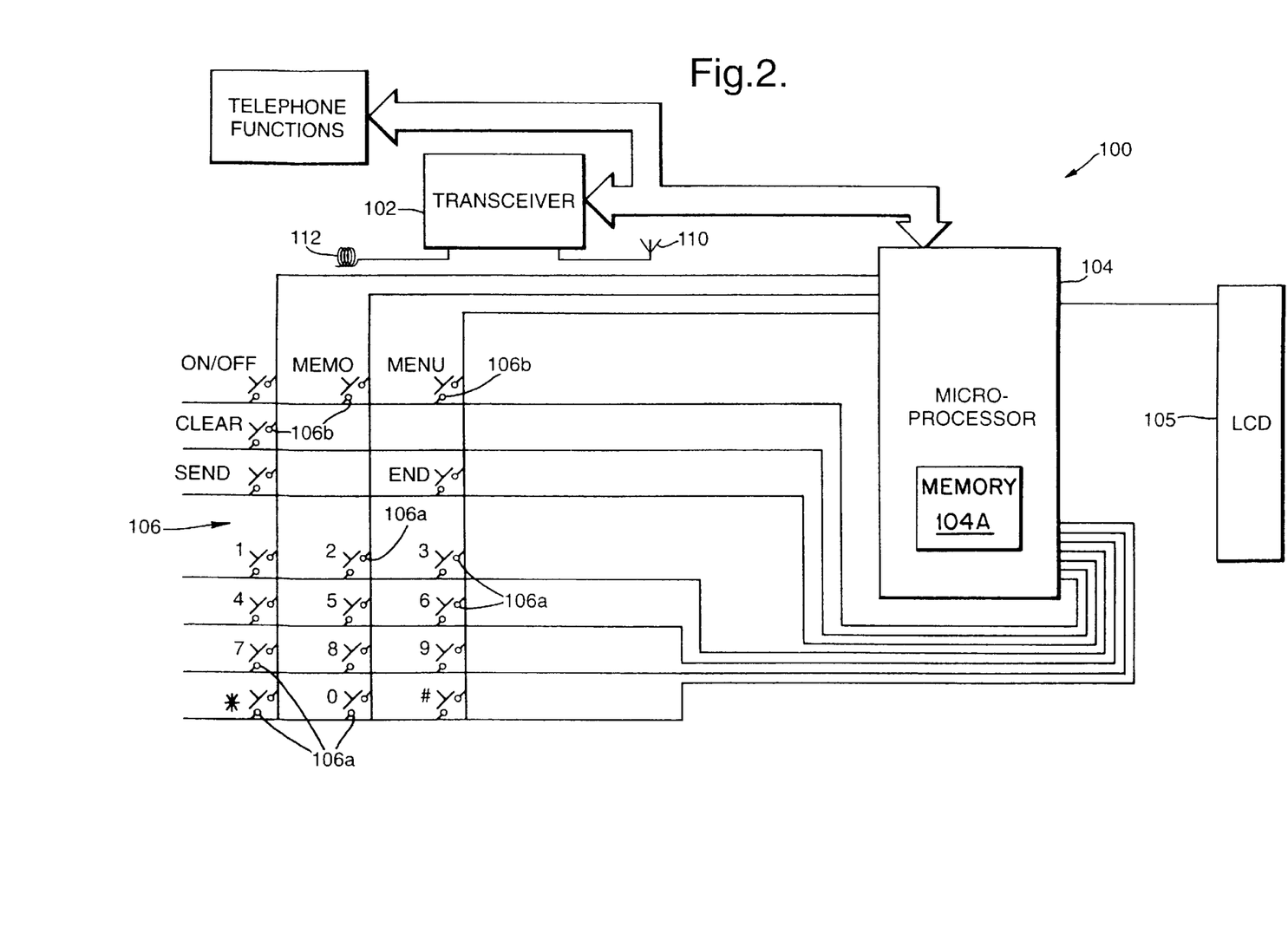
FIG. 2 is a block diagram of the radio telephone shown in FIG. 1.

The microprocessor 104 includes or is coupled to a memory 104A, in a conventional fashion. The memory 104A stores a program, a part of which is used to implement the teachings of this invention.

The user-interface of telephone 100 comprises a display, e.g. a liquid crystal display 105, itself well-known in the art and a keypad 106 on the front of the telephone 100. The display is coupled to and regulated by the microprocessor 104 in the usual manner. The keypad 106 essentially comprises two main sets of keys, namely alpha numeric keys 106a associated with alpha numeric data especially for dialling telephone numbers, but also (optionally) for entering alphanumeric data into the telephone memories, e.g. a subscriber number index, and a set of function keys 106b for enabling various predetermined functions or operations. The keys 106a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. The alphabetic rather than numeric data is selected for example by preceding the alphanumeric keystroke with another predetermined keystroke or set of keystrokes, specifically using the function keys. Hence the alphabetic data mode may be enabled for example by preceding the particular keystroke with previously depressing a "MEMORY" or "STORE" key disposed among the function keys 106b.

As is usual in cellular telephones, the keys 106b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 105. For example, the user may be able to select the ringing tone by appropriate menu selection. More sophisticated options may also be available via the menu facility. For example, the user may be able to enable the so-called Discontinuous Transmission mode which employs a voice activated switch which helps to reduce battery drain by transmitting only when speech is input to the microphone.

The telephone 100 also includes a power ON/OFF button 108, an external antenna 110, (typically a retractable antenna) and an internal antenna 112 which is typically a helical or coil antenna.

Figure 3:
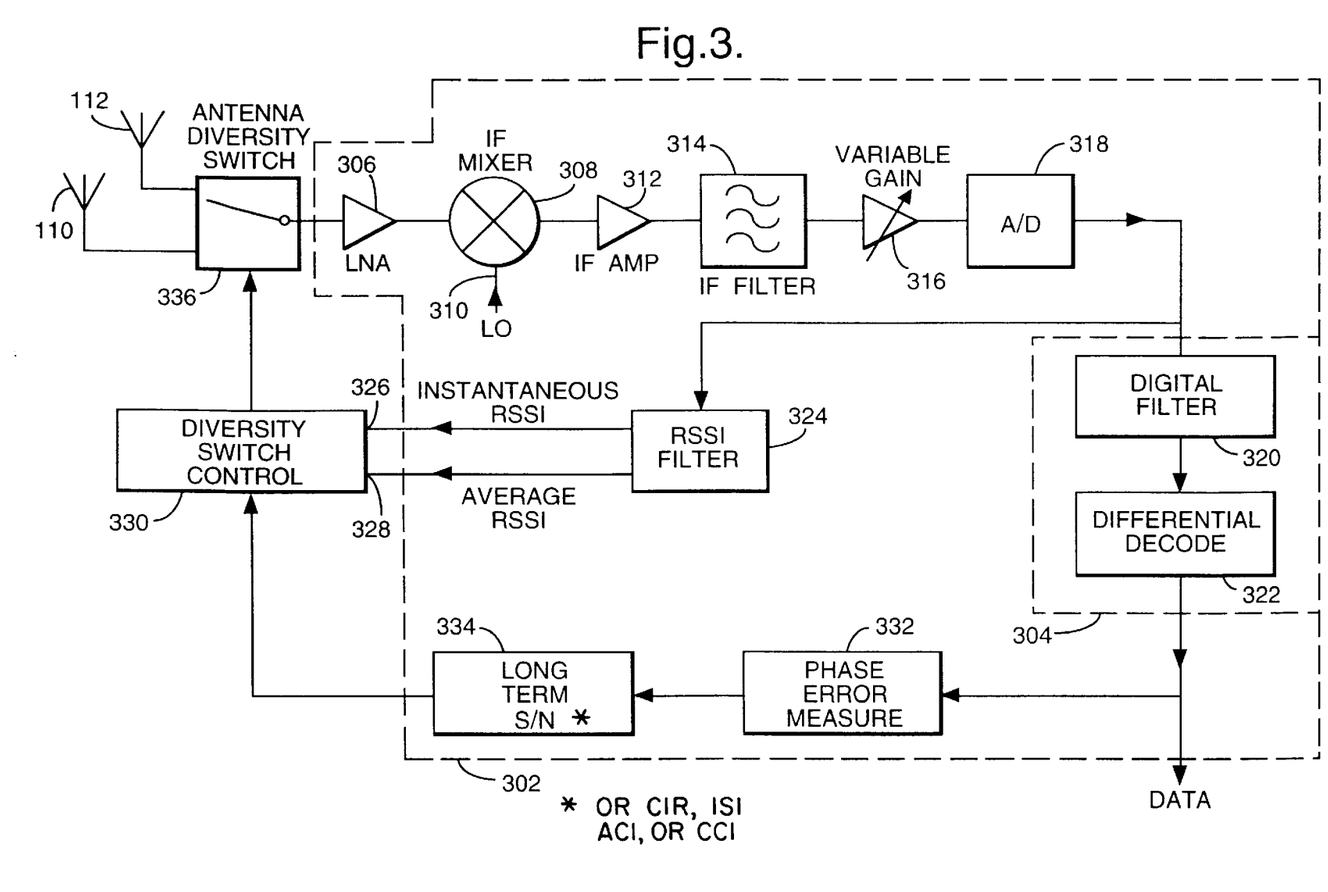
FIG. 3 is a block diagram of a receiver and antenna switching circuitry for use with the present invention.

Transceiver 102 includes a receiver 302, shown schematically in FIG. 3 and in the embodiment described herein suitable for receiving phase modulated signals. The receiver 302 includes a demodulator 304 which demodulates received signals and outputs the demodulated signal to other telephone functions such as the audio circuitry. The receiver 302 comprises a low noise amplifier (LNA) 306 for receiving signals input to the receiver 302. The output of the LNA 306 is input to an Intermediate Frequency (IF) mixer 308, which also has a local oscillator 310 (LO) input. An intermediate frequency is output from the IF mixer 308 to an IF amplifier 312. The output from the IF amplifier 312 is input to an IF filter, and the filtered signal is input to a variable amplifier 316. The output of the amplifier 316 is sampled in an analogue to digital converter 318. The digital signal is input to demodulator 304 where it is digitally filtered in filter 320 and decoded in differential decoder 322. The output of the decoder 322 is then sent to other telephone circuitry such as the audio circuitry for reproduction as speech.

The receiver 302 also comprises a received signal strength indicator (RSSI) filter 324. The RSSI filter 324 has as an input the digitised received signal output from A/D converter 318. The RSSI filter 324 produces signals which are indicative of the strength of a signal received by the receiver 302. The RSSI filter 324 produces two signals, instantaneous RSSI 326 and average RSSI 328, which are input to diversity switch control logic 330. The average RSSI 328 may comprise contributions from signals received by the receiver 302 via either of antennas 110, 112.

The receiver 302 also includes phase error measurement circuitry 332, which inspects the phase information from the decoded signal to determine the error level in that signal. The phase error measurement result is then fed to a long term signal to noise ratio measuring circuit 334, which produces a signal indicative of the average signal to noise ratio for the received signal. A signal indicative of the average signal to noise ratio is input to the diversity switch control circuitry 330. The present invention is not limited to the use of the signal to noise ratio as a measure of signal quality, but includes measures such as carrier to interference ratio, (CIR) intersymbol interference (ISI), adjacent channel interference (ACI) and co-channel interference (CCI) for example, which relate to an error rate probability.

The receiver 302 is coupled to the antennas 110, 112, often known as diversity antennas, via an antenna diversity switch 336, which is controlled by the diversity switch control circuitry 330 to select one or other of antennas 110, 112 from which to receive a signal.

Figure 4:
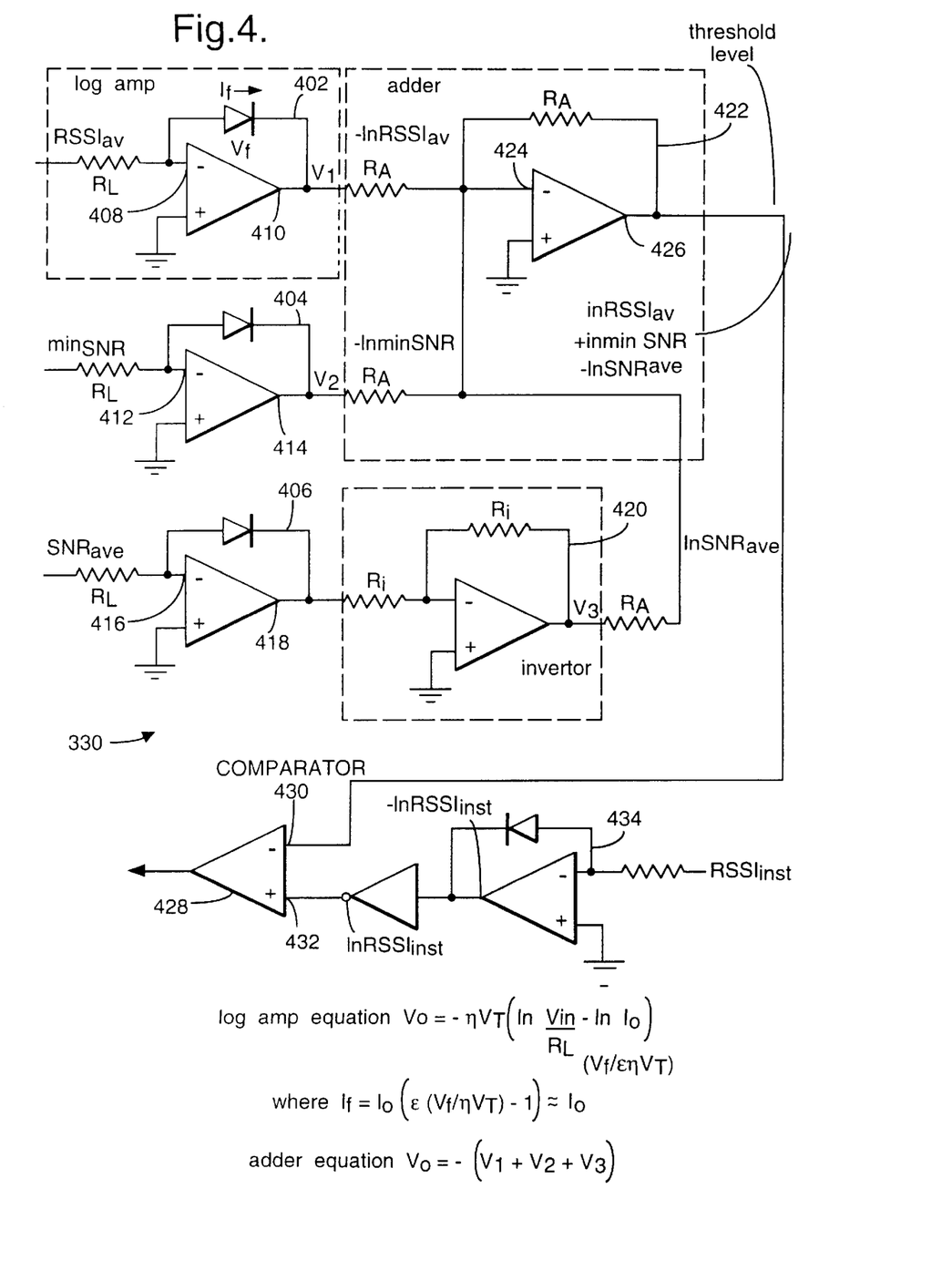
FIG. 4 shows a circuit diagram of an antenna diversity switch control in accordance with a first embodiment of the present invention.

Referring to FIG. 4 there is shown an embodiment of diversity switch control circuitry 330 in accordance with the present invention. The switch control circuitry 330 comprises three log. amplifiers, 402, 404 and 406. The first log. amp. 402 has as its negative input 408 a signal indicative of the average RSSI, and outputs 410 a voltage $V_1$ indicative of log. $RSSI_{av}$. Log. amp 404 has as its negative input 412 a signal indicative of the minimum acceptable signal to noise ratio (SNR) for the system. The output 414 $V_2$ is proportional to log. min SNR. A signal indicative of the average signal to noise ratio is input 416 to log. amp. 406 which outputs 418 a signal indicative of log. $SNR_{ave}$. Output 418 is input to inverter 420, to produce an inverted output $V_3$. Respective voltages $V_1$, $V_2$ and $V_3$ are coupled via resisters $R_A$ to the negative input 424 of op-amp 422 to form an adder. The output 426 forms the threshold level. The threshold level is input to the negative input 430 of comparator 428. The positive input 432 for 428 is coupled to the inverted output of log. amp. 434 which log. amplifies the instantaneous RSSI level ($RSSI_{inst}$). The output signal of comparator 428 is coupled to the antenna diversity switch to cause switching of the antenna when the instantaneous RSSI crosses the threshold level.

Figure 5:
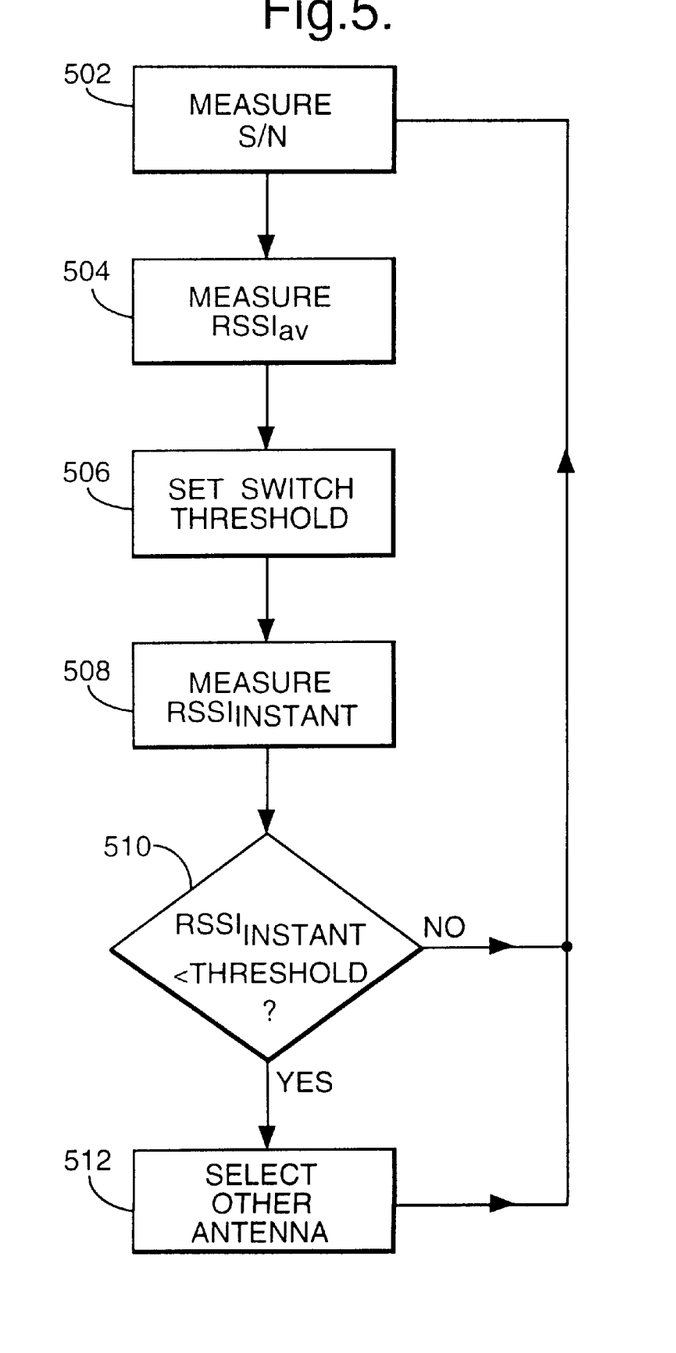
FIG. 5 is a flow diagram for operating a radio telephone in accordance with a second embodiment of the present invention.

Optionally, in another embodiment, the diversity switch control circuitry 330 may be disposed in a digital signal processor (DSP) or microcomputer 104 typically provided in the radio telephone 100 and conditioned to operate in accordance with the flow chart shown in FIG. 5, thereby providing means for comparing the signal quality of the received signal with a reference level, and adjusting the reference level in accordance with a received signal quality characteristic.

At step 502 the average signal to noise ratio, or other suitable signal quality measure, of signals received by the receiver is measured. The average signal to noise ratio is the average signal to noise ratio from both antennas, since typically both antennas will have been operable within the time constant of the averaging circuitry. Then the average RSSI is determined at step 504. The antenna switch threshold is then determined as a function of the average RSSI and average signal to noise ratio at step 506. The antenna switch threshold is determined in accordance with the following equation, $$\frac{(\text{average } RSSI)}{(\text{average } SNR)} \times (\text{min acceptable } SNR),$$

noise ratio (SNR) is in the range from about 2 dB to 7 dB for a Differential Quaternary Phase Shift Keyed (DQPSK) modulation system as used for example in the Japanese PDC radio telephone system. It will be evident to a skilled person that the minimum acceptable SNR can very depending upon the modulation scheme used in the telephone system, and can be determined by analysis or empirical inspection.

The instantaneous RSSI from the currently operating antenna is then measured at step 508. The instantaneous RSSI is compared with the antenna switch threshold at step 510, and if it is less than the threshold the other antenna is selected at step 512. The flow chart then returns to step 502. If at step 510 it is found that the instantaneous RSSI is equal to or not less than the antenna switching threshold the flow chart returns to step 502. In this manner, antenna switching only occurs when it is necessary. If the signal to noise ratio is sufficiently high such that deep fades in instantaneous RSSI can be tolerated the antenna switching threshold is set such that the instantaneous RSSI has to fall lower than it would if the signal to noise ratio were lower, before antenna switching occurs.

It will be evident to a person skilled in the art that various modifications falling within the scope of the appended claims may be made to the described embodiment. For example, the signal quality measure which is used to modify the antenna switching threshold need not be the signal to noise ratio of the received signal, but some other measure of signal quality such as carrier to interferer ratio, co-channel or adjacent channel interference and intersymbol interference for example, or combinations thereof. Additionally, although the embodiment in accordance with the invention has been described with reference to a receiver for phase modulated signals, other forms of modulation may also be used with the present invention.

In the described embodiment, the antenna diversity switch is disposed before the receiver section of the telephone, thereby requiring only one receiver section. Optionally, two separate receiver paths may be provided, one for each antenna. In such an embodiment the antenna diversity switch can be placed after the receivers and before the audio circuitry. The diversity switch control then can have separate instantaneous and average RSSIs inputs from both receivers, as well as separate signals indicative of signal quality. The present invention can be applied to such an embodiment to reduce needless switching between antennas and respective receivers.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. Antenna selection control apparatus for a receiver having at least two antennas, comprising means for monitoring a signal quality of a signal received from a selected one of at least two antennas, comparing means for comparing the signal quality of the received signal with a reference signal quality level, selection means for selecting another of the at least two antennas in accordance with the comparison, and means for determining a signal quality characteristic for received signals, wherein there is further provided reference signal quality level adjustment means for adjusting the reference signal quality level in accordance with said signal quality characteristic, wherein the means for determining a further signal quality characteristic measures signal to noise ratio, and wherein the reference signal quality level is determined in accordance with the following equation $$ref. = \frac{averageRSSI}{averageSNR} * \min SNR,$$

where ref. is the reference signal quality level, average RSSI is the average RSSI for received signals, average SNR is the average signal to ratio for received signals and min SNR is a minimum signal to noise ratio suitable for the type of signals received from the antennas.

2. A method for selecting an antenna for a receiver having at least two antennas, comprising the step of comparing a signal indicative of received signal quality from a selected one of the at least two antennas with a reference signal quality level, and the step of selecting another of the at least two antennas in accordance with the comparison, characterized by the step of adjusting the reference signal quality level in accordance with a further signal quality characteristic for received signals, wherein the signal quality reference level is increased for a decrease in signal quality characteristic.

3. Antenna selection control apparatus for a receiver, said receiver constructed to receive an incoming signal from at least two antennas, comprising:

a first monitor for sensing instantaneous received signal strength indications of said incoming signal;

a second monitor for sensing a received signal characteristic indicative of the signal quality of said incoming signal;

a processor for determining a reference received signal strength threshold, wherein said processor determines said threshold based on said received signal strength indication adjusted in accordance with said received signal quality indicating characteristic, such that said threshold will vary inversely with the received signal quality characteristic;

a comparator for comparing the received signal strength indication of the received signal with said reference received signal strength threshold; and selection means for selecting another of the at least two antennas in accordance with the comparison.

4. Antenna selection control apparatus for a receiver, said receiver constructed to receive an incoming signal from at least two antennas, as described in claim 3, further comprising:

a module for calculating the average of said sensed signal strength indications over a period of time;

a storage device for storing a predetermined minimum value for said quality indicating characteristic; and wherein said processor determines said threshold based on said average received signal strength indication adjusted in accordance with said received signal quality indicating characteristic and said predetermined minimum value for said quality characteristic, such that said threshold will vary inversely with the received signal quality characteristic.

5. Antenna selection control apparatus for a receiver having at least two antennas, as described in claim 3 wherein the received signal characteristic indicative of signal quality is in the alternative, signal to noise ratio, carrier to interferer ratio, cochannel interference, adjacent channel interference, intersymbol interference, or combinations thereof.

6. A method for selecting an antenna for a receiver constructed to receive an incoming signal from at least two antennas, comprising the steps of:

sensing instantaneous received signal strength indications of said incoming signal;

sensing a received signal characteristic indicative of signal quality;

determining a reference received signal strength threshold, wherein said threshold is based on said received signal strength indication adjusted in accordance with said received signal quality indicating characteristic, such that said threshold will vary inversely with the received signal characteristic;

comparing the received signal strength indication of the received signal with said reference received signal strength threshold; and selecting another of the at least two antennas in accordance with the comparison.

7. A method for selecting an antenna for a receiver constructed to receive an incoming signal from at least two antennas, as described in claim 6, further comprising the steps of:

determining the average of said signal strength indications over a period of time;

storing a predetermined minimum value for said quality signal characteristic; and wherein said step of determining a reference received signal strength threshold is based on said average received signal strength indication adjusted in accordance with said received signal quality indicating characteristic and said predetermined minimum value for said received signal characteristic, such that said threshold will vary inversely with the second received signal characteristic.

8. A method for selecting an antenna for a receiver having at least two antennas, as described in claim 6, wherein the second received signal characteristic indicative of signal quality is in the alternative, signal to noise ratio, carrier to interferer ratio, cochannel interference, adjacent channel interference, intersymbol interference, or combinations thereof.

* * * * *